United States Patent
Takahashi et al.

(10) Patent No.: US 6,731,836 B2
(45) Date of Patent: May 4, 2004

(54) DISPERSION COMPENSATOR

(75) Inventors: Hidenori Takahashi, Kamifukuoka (JP); Masashi Usami, Kamifukuoka (JP); Kosuke Nishimura, Kamifukuoka (JP)

(73) Assignee: KDDI Submarine Cable Systems, Inc., Tokyo (JP)

( * ) Notice: Subject to any disclaimer, the term of this patent is extended or adjusted under 35 U.S.C. 154(b) by 0 days.

(21) Appl. No.: 10/033,616

(22) Filed: Dec. 26, 2001

(65) Prior Publication Data

US 2002/0081074 A1 Jun. 27, 2002

(30) Foreign Application Priority Data

Dec. 27, 2000 (JP) .......................... 2000-396619

(51) Int. Cl.⁷ ................................. G02B 6/28
(52) U.S. Cl. ............................ 385/24; 385/11; 385/28; 385/47
(58) Field of Search ................. 385/24, 11, 28, 385/47

(56) References Cited

U.S. PATENT DOCUMENTS

| | | |
|---|---|---|
| 5,682,447 A | 10/1997 | Kuzyk et al. |
| 5,701,188 A | 12/1997 | Shigematsu et al. ........ 359/161 |
| 5,715,265 A | 2/1998 | Epworth ..................... 372/38 |
| 5,805,759 A | 9/1998 | Fukushima |
| 5,974,206 A | 10/1999 | Bricheno et al. ............. 385/11 |
| 6,055,081 A | 4/2000 | Koyano et al. ............. 359/161 |
| 6,310,993 B1 * | 10/2001 | Cao et al. ..................... 385/24 |
| 6,404,952 B1 * | 6/2002 | Danziger ..................... 385/28 |
| 6,483,957 B1 * | 11/2002 | Hamerly et al. ............. 385/11 |
| 2001/0021053 A1 | 9/2001 | Colbourne et al. |

FOREIGN PATENT DOCUMENTS

| | | |
|---|---|---|
| EP | 0 933 657 A2 | 8/1999 |
| EP | 0 933 657 A3 | 8/1999 |
| EP | 1 016 884 A3 | 7/2000 |
| EP | 1 016 884 A2 | 7/2000 |
| JP | 8-316912 | 11/1996 |
| JP | 11-331075 | 11/1999 |
| JP | 2000-235170 | 8/2000 |

OTHER PUBLICATIONS

European Search Report dated Apr. 23, 2003 for corresponding European Patent application EP 01 12 7571.

* cited by examiner

Primary Examiner—Hemang Sanghavi
Assistant Examiner—Eric Wong
(74) Attorney, Agent, or Firm—Christie, Parker & Hale, LLP

(57) ABSTRACT

An optical circulator outputs an optical signal entered through its port A from its port B. A fiber collimator makes the optical signal spread out from the port B of the optical circulator into a collimated beam and applies it to a beam splitter. The beam splitter is disposed at an angle of 45° to the optical axis. Around of the beam splitter, total reflection mirrors are disposed in three directions per angle of 90° except for the direction in which the fiber collimator is disposed. The distance between the total reflection mirrors and the beam splitter is adjustable.

5 Claims, 4 Drawing Sheets

DISPERSION COMPENSATOR

CROSS-REFERENCE TO RELATED APPLICATION

This application claims priority of Japanese Patent application number 2000-396619, filed Dec. 27, 2000.

FIELD OF THE INVENTION

This invention relates to a dispersion compensator and more specifically to a dispersion compensator to compensate group velocity dispersion and dispersion slopes in optical communications.

BACKGROUND OF THE INVENTION

Currently, the research of large capacity optical communication networks using wavelength division multiplexing (WDM) transmission systems has been eagerly performed according to the plan to use them as infrastructures for supporting the future information-oriented society. At the same time, dispersion compensating devices to greatly improve the performance of the optical networks have become extremely important. They are also researched and examined.

As one of conventional dispersion compensators, a configuration to combine an optical circulator and a dispersion compensating fiber is well known. See U.S. Pat. Nos. 5,701,188, 5,715,265 and 5,974,206, and Japanese Laid-Open Patent Publication No. Heisei 8-316912 (i.e. U.S. Pat. No. 6,055,081).

A dispersion compensating fiber is a fiber having a chromatic dispersion value of a sign reverse to that of an optical transmission fiber and preferably its dispersion slope inclines reversely to that of the optical transmission fiber. The dispersion compensating fiber also can be composed of a fiber that forms a chirped grating. Although the optical circulator is generally used as a means to separate input light and output light, other configurations such as to use Y branch waveguide (See Japanese Laid-Open Patent Publication No. 2000-235170) and to use a 3 dB optical coupler (see Japanese Laid-Open Publication No. Heisei 11-331075) are also known. To broaden a band, a configuration to connect a plurality of the above-described basic configurations as a multistage type has been proposed.

When an optical fiber grating is practically to be applied to optical communications, its length needs to be one meter or more. It is difficult to form such a long grating in an optical fiber all at once. Accordingly, it is necessary to form gratings separately on a plurality of areas. However, this method requires high production costs.

In the conventional configuration to use a Y branch waveguide instead of an optical circulator, to keep the phase relation between two branched light waves is too difficult to realize.

In the conventional configuration to use an optical coupler instead of an optical circulator, it is difficult to realize a predetermined phase relation between the two light waves that are branched and fed back.

SUMMARY OF THE INVENTION

A dispersion compensator comprises a first optical path pair having a first and a second optical paths, a second optical path pair having a third and a fourth optical paths, an optical coupler connecting to one end of the first, second, third, and fourth optical paths to split the light from the first optical path pair to the third and fourth optical paths and the light from the second optical path pair to the first and second optical paths, an optical signal input/output device to input the optical signal into the first optical path through the other end of the first optical path and to output the light output from the other end of the first optical path, and three mirrors respectively disposed on the other end of the second, third, and fourth optical paths. With this configuration, the chromatic dispersion can be compensated with a compact configuration.

For example, the optical coupler is composed of a beam splitter and the first, second, third, and fourth optical paths consisting of an open optical system respectively. Preferably, at least two out of the three mirrors are slidable in the direction of respective optical axis. With this configuration, the wavelength characteristics of the dispersion compensation can be controlled.

The optical coupler also can include a directional optical coupler. In this case, the first, second, third, and fourth optical paths consist of an optical waveguide respectively. With this configuration, a compact and stable dispersion compensator is realized. Preferably, means to control optical lengths of at least two of the first, second, third, and fourth light paths should be disposed. With this configuration, the wavelength characteristics of the dispersion compensation can be controlled.

By using an optical coupler which optical branching ratio depends on a wavelength, the wavelength characteristics of group velocity dispersion can be controlled.

BRIEF DESCRIPTION OF THE DRAWING

The above and other objects, features and advantages of the present invention will be apparent from the following detailed description of the preferred embodiments of the invention in conjunction with the accompanying drawings, in which.

DETAILED DESCRIPTION

Embodiments of the invention are explained below in detail with reference to the drawings.

Figure 1:
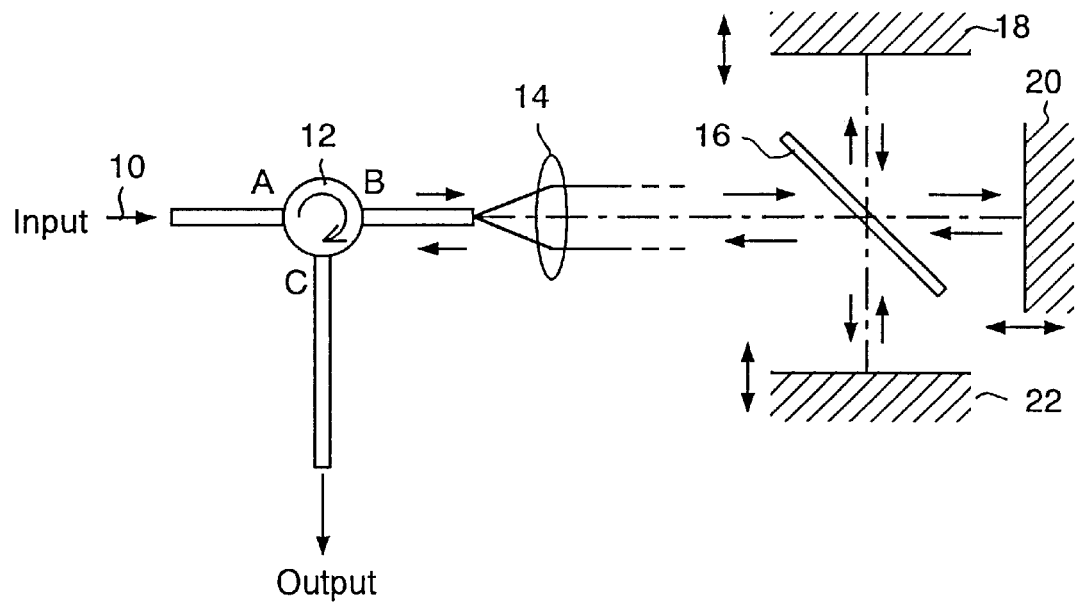
FIG. 1 shows a schematic block diagram of a first embodiment according to the invention.

FIG. 1 shows a schematic block diagram of a first embodiment according to the invention. An optical signal 10 enters a port A of an optical circulator 12 having three ports A, B, and C. The optical circulator 12 is an optical element to output the input light of the port A from the port B and output the input light of the port B from the port C, as is generally known. The optical circulator 12 outputs the optical signal 10 from the port B.

A fiber collimator 14 is disposed on the port B of the optical circulator 12. The fiber collimator 14 changes the optical signals spread out from the port B of the optical circulator 12 into collimated beams. A beam splitter 16 of an angle of 45° is disposed in front of the fiber collimator 14. The branching ratio of the beam splitter 16 depends on a wavelength. Namely, the ratio of the light reflected by the beam splitter 16 to the light that transmits the beam splitter 16 depends on a wavelength. Total reflection mirrors 18, 20, and 22 are disposed around the beam splitter 16 in three directions per angle of 90° except for the direction in which the fiber collimator 14 is disposed. The distance between the total reflection mirrors 18, 20, and 22 and the beam splitter 16 is adjustable. As far as the object of this embodiment concerns, it is sufficient when at least two of the three mirrors are slidable in the direction of the optical axis.

The optical signal output from the fiber collimator 14 and input the beam splitter 16 is split by the beam splitter 16. The split lights are reflected by the mirrors 18, 20 and 22, combined by the beam splitter 16, and enter the port B of the optical circulator 12 through the fiber collimator 14.

FIGS. 2 through 5 show main propagation routes of the optical signal processed by the beam splitter 16 and mirrors 18, 20, and 22. Here, the distance or optical path between the beam splitter 16 and the mirror 18 is expressed as A, the distance or optical path between the beam splitter 16 and the mirror 20 is expressed as B, and the distance or optical path between the beam splitter 16 and the mirror 22 is expressed as C. The reflection factor and the transmission factor of the beam splitter 16 are expressed as R and (1−R) respectively.

Figure 3:
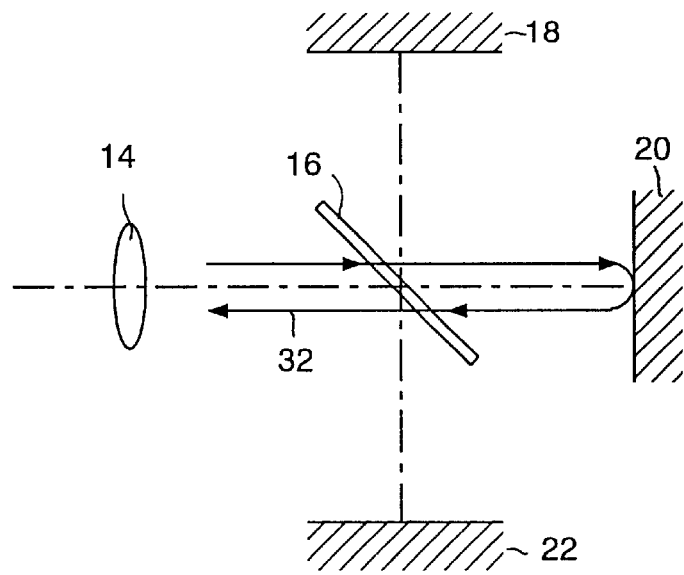
FIG. 3 shows a second optical propagation example of the first embodiment.
Figure 4:
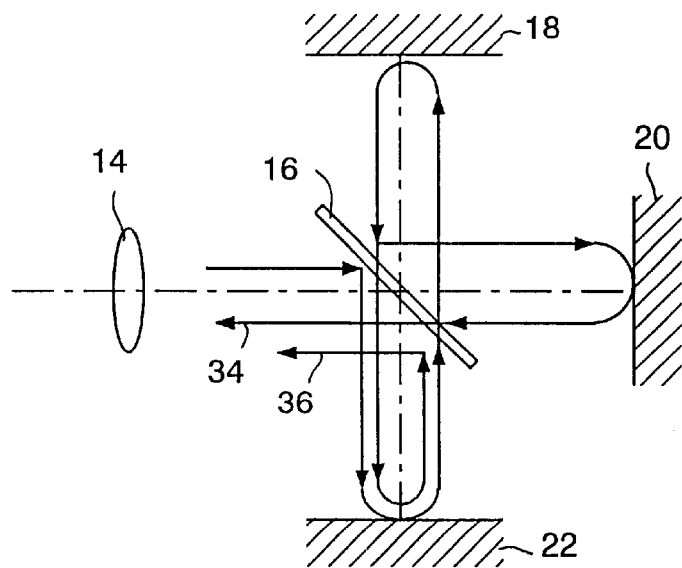
FIG. 4 shows a third optical propagation example of the f first embodiment.
Figure 5:
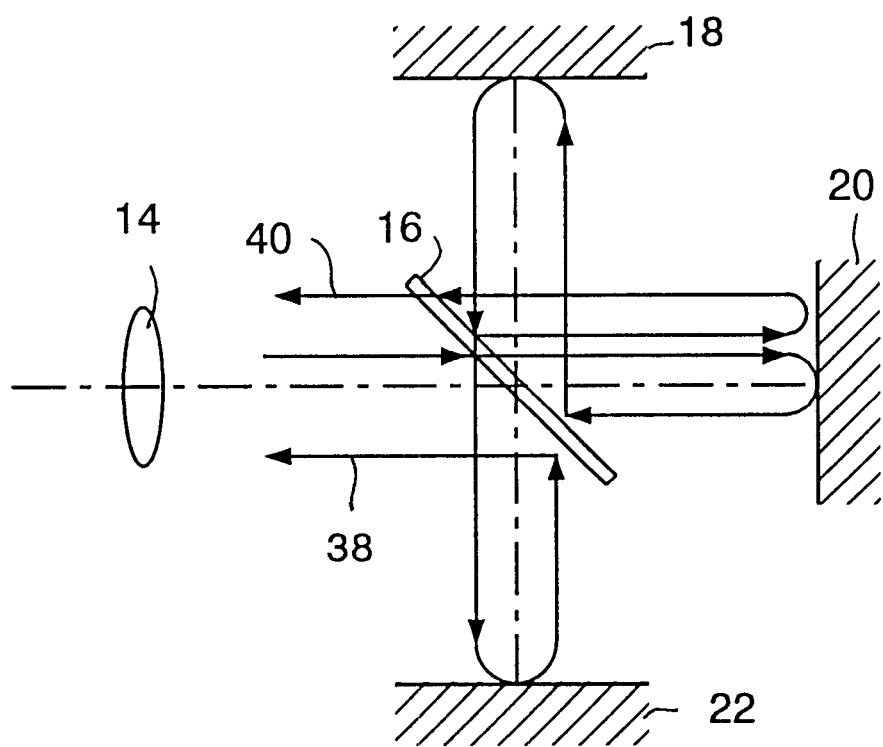
FIG. 5 shows a fourth optical propagation example of the first embodiment.

The optical signal enters the beam splitter 16 from the fiber collimator 14 is separated into the signal light to transmit the beam splitter 16 and the one to be reflected by the beam splitter 16. The reflected optical signal propagates toward the mirror 22. The propagation routes of the reflected optical signal are shown in FIGS. 2 and 4 and those of the transmission optical signal are shown in FIGS. 3 and 5.

The first reflected optical signal of the beam splitter 16 is reflected by the mirror 22 and enters the beam splitter 16 again to be split. Among the optical signals enter the beam splitter 16 from the mirror 22, the optical signal reflected by the beam splitter 16 enters the fiber collimator 14 as shown in FIG. 2. The optical signal transmitted the beam splitter 16 is reflected by the mirror 18 and split by the beam splitter 16 again as shown in FIG. 4. As shown in FIG. 4, the reflected light of the beam splitter 16 propagates toward the mirror 20, reflected by the mirror 20, and propagates toward the fiber collimator 14 through the beam splitter 16. On the other hand, the transmission light of the beam splitter 16 propagates toward the mirror 22, reflected by the mirror 22, then reflected by the beam splitter 16 and propagates toward the fiber collimator 14.

The first transmission optical signal of the beam splitter 16 is reflected by the mirror 20 and enters the beam splitter 16 again to be split. Among the optical signals enters the beam splitter 16 from the mirror 20, the optical signal transmitted the beam splitter 16 enters the fiber collimator 14 as shown in FIG. 3. The optical signal reflected by the beam splitter 16 is reflected by the mirror 18 and enters the beam splitter 16 to be split again as shown in FIG. 5. As shown in FIG. 5, the optical signal reflected by the beam splitter 16 propagates toward the mirror 20, reflected by the mirror 20 and propagates toward the fiber collimator 14 through the beam splitter 16. On the other hand, the optical signal transmitted the beam splitter 16 propagates toward the mirror 22, reflected by the mirror 22, then reflected by the beam splitter 16, and propagates toward the fiber collimator 14.

Figure 2:
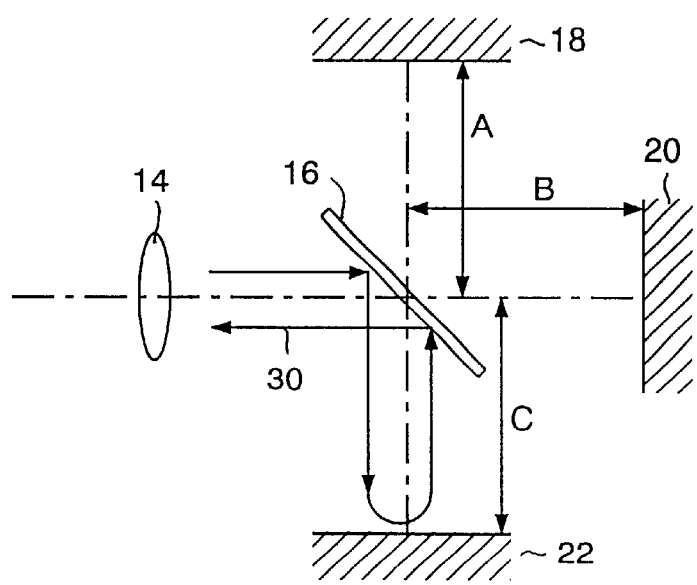
FIG. 2 shows a first optical propagation example of the first embodiment.

A return optical signal 30 shown in FIG. 2 is an optical signal reflected by the beam splitter 16, the mirror 22, and the beam splitter 16. The amplitude and the optical path length of the optical signal 30 are expressed as $R^2$ and $2C$ respectively.

A return optical signal 32 shown in FIG. 3 is an optical signal transmitted the beam splitter 16, reflected by the mirror 20 and transmitted the beam splitter 16 again. The amplitude and the optical path length of the optical signal 32 are expressed as $(1-R)^2$ and $2B$ respectively.

A return optical signal 34 shown in FIG. 4 is an optical signal reflected by the beam splitter 16 and the mirror 22, transmitted the beam splitter 16, reflected by the mirror 18, the beam splitter 16, and the mirror 20, and transmitted the beam splitter 16. The amplitude and the optical path length of the return optical signal 34 are expressed as $R^2(1-R)^2$ and $(2A+2B+2C)$ respectively. A return optical signal 36 shown in FIG. 4 is an optical signal reflected by the beam splitter 16 and the mirror 22, transmitted the beam splitter 16, reflected by the mirror 18, transmitted the beam splitter 16, and reflected by the mirror 22 and the beam splitter 16. The amplitude and the optical path length of the return optical signal 36 are expressed as $R^2(1-R)^2$ and $(2A+4C)$ respectively.

A return optical signal 38 shown in FIG. 5 is an optical signal transmitted the beam splitter 16, reflected by the mirror 20, the beam splitter 16, and the mirror 18, transmitted the beam splitter 16, and reflected by the mirror 22 and the beam splitter 16. The amplitude and the optical path length of the return optical signal 38 are expressed as $R^2(1-R)^2$ and $(2A+2B+2C)$ respectively. A return optical signal 40 shown in FIG. 5 is an optical signal transmitted the beam splitter 16, reflected by the mirror 20, the beam splitter 16, the mirror 18, the beam splitter 16, and the mirror 20, and transmitted the beam splitter 16. The amplitude and the optical path length of the return optical signal 40 are expressed as $R^2(1-R)^2$ and $(2A+4B)$ respectively.

In the embodiment shown in FIG. 1, a resonator is formed with the beam splitter 16 and mirrors 18, 20 and 22. Accordingly, the optical signal is reflected more frequently among the mirrors 18, 20, and 22. However, since the optical signal deteriorates as it passes through and reflected by the beam splitter 16, it is less affected compared to the optical signals 30 through 40 shown in FIGS. 2 through 5. In addition, because the branching ratio of the beam splitter 16 depends on a wavelength, the life of the component multi-reflected between the mirrors 18, 20 and 22 differs according to a wavelength.

The optical signals reentered the port B of the optical circulator 12 are mainly composed of the optical signals 30 through 40 shown in FIGS. 2 through 5. The optical signal entered the port B of the optical circulator 12 is output from the port C of the optical circulator 12.

As understandable from the above explanation, in this embodiment, by appropriately setting the wavelength characteristics of the branching ratio of the beam splitter 16, namely the wavelength characteristics of the reflection factor R, and distances A, B and C between the beam splitter 16 and the respective mirrors 18, 20, and 22, it is possible to give the input optical signal 10 a desired phase delay that differs per wavelength. Accordingly, the group delay dispersion of the input optical signal 10 is compensated.

Figure 6:
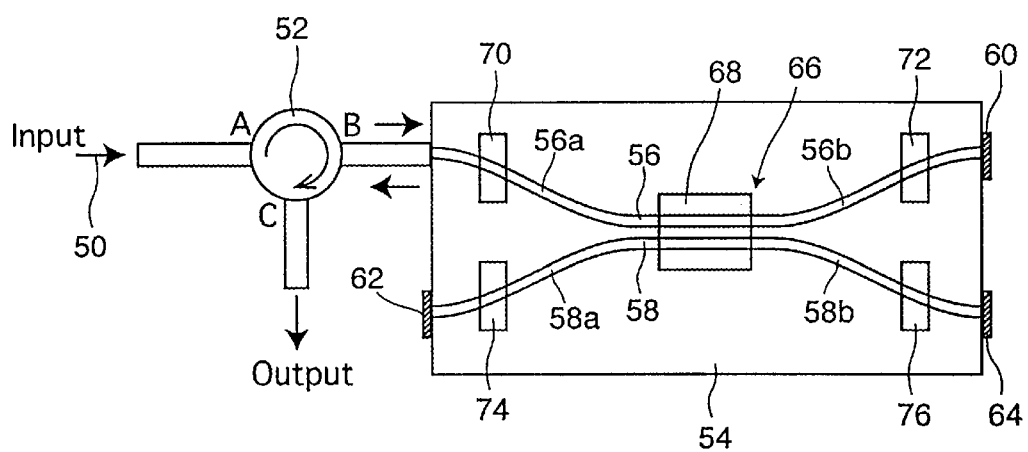
FIG. 6 shows a schematic block diagram of a second embodiment according to the invention.

Although the embodiment of the open optical system is explained above, the same result can be obtained when the part composed of the beam splitter 16 and the mirrors 18, 20, and 22 consists of a waveguide optical system. A schematic diagram of such embodiment is shown in FIG. 6.

An optical signal 50 enters a port A of an optical circulator 52 having the same function with the optical circulator 12.

The optical circulator 52 inputs the optical signal 50 into an optical flat circuit 54 having the similar function to the optical circuit composed of the beam splitter 16 and the mirrors 18, 20 and 22.

The optical plane circuit 54 consists of two waveguides 56 and 58 disposed adjacent so as to optically connect each other at respective center parts. One end of the waveguide 56 is optically connected to the port B of the optical circulator 52. On the other end of the waveguide 56, a total reflection mirror 60 is formed. Similarly, on both sides of the waveguide 58, total reflection mirrors 62 and 64 are formed.

The area in which the center parts of the waveguides 56 and 58 approach each other forms a directional coupler 66 with two terminal pairs. A heater 68 is disposed on the directional coupler 66 so that the branching ratio is controlled from the outside. Instead of the thermal expansion by the heater 68, the mechanical stress is also applicable.

Heaters 70 and 72 are disposed respectively on an optical path 56a of the waveguide 56 between the directional coupler 66 and the optical circulator 52 and on an optical path 56b of the waveguide 56 between the directional coupler 66 and the mirror 60. Similarly, heaters 74 and 76 are disposed respectively on an optical path 58a of the waveguide 58 between the directional coupler 66 and the mirror 62 and on an optical path 58b of the waveguide 58 between the directional coupler 66 and the mirror 64. The optical length of the optical paths 56a, 56b, 58a, and 58b can be controlled from the outside through the heaters 70, 72, 74, and 76. Instead of the thermal expansion using the heaters 70, 72, 74, and 76, the mechanical stress is also applicable. This method corresponds to the way in which the mirrors 18, 20, and 22 are set to be slidable in the direction of the optical axis in the embodiment shown in FIG. 1.

The operation of the embodiment shown in FIG. 6 is explained below. The optical circulator 52 inputs the optical signal 50 entered through the port A into the waveguide 56 (optical path 56a) of the optical flat circuit 54 from the port B. The optical signal propagates on the optical path 56a and is split by the directional coupler 66 into the optical paths 56b and 58b at a predetermined branching ratio.

The light entered the optical path 56b from the directional coupler 66 is totally reflected by the mirror 60 and reenters the directional coupler 66. The directional coupler 66 splits the light entered from the optical path 56b into the optical paths 56a and 58a. The light entered the optical path 56a propagates on the optical path 56a and enters the port B of the optical circulator 52. The light entered the optical path 58a is totally reflected by the mirror 62 and reenters the directional coupler 66 to be split into the optical paths 56b and 58b.

The light entered the optical 58b from the directional coupler 66 is totally reflected by the mirror 64 and reenters the directional coupler 66. The directional coupler 66 splits the light from the optical path 58b into the optical paths 56a and 58a. The light entered the optical path 56a propagates on the optical path 56a and enters the port B of the optical circulator 52. The light entered the optical path 58a is totally reflected by the mirror 62 and reenters the directional coupler 66 to be split into the optical paths 56b and 58b.

As explained above, the optical flat circuit 54 operates practically similar to the optical circuit composed of the beam splitter 16 and the mirrors 18, 20, and 22 in the embodiment shown in FIG. 1. Since the branching ratio of the directional coupler 66 and the optical path length of the optical paths 56a, 56b, 58a, and 58b generally differ according to a wavelength, the embodiment shown in FIG. 6 also can compensate all the group velocity dispersion and dispersion slope of different wavelengths similarly to the embodiment in FIG. 1.

The optical circulators 12 and 52 are used to separate the input light and the output light of the optical circuit, composed of the beam splitter 16 and the mirrors 18, 20, and 22, and optical flat circuit 54. Obviously, an input/output separating optical circuit that has the equivalent function is also applicable instead of the optical circulators 12 and 52.

It is easy to produce the above-mentioned embodiments since it is unnecessary to form along grating. By shortening the optical length of the branching path of the beam splitter 16 or the directional coupler 66, free spectral region of the resonator formed by the mirrors 18, 20, 22; 60, 62, 64 can be equalized to the frequency interval of the WDM communication and therefore a desired amount of the group delay or group velocity dispersion, also dispersion slope can be compensated.

As readily understandable from the aforementioned explanation, according to the invention, group delay or group velocity dispersion of WDM optical signals, and also dispersion slope, can be compensated using low-priced and simple configuration. In addition, the group delay or group velocity dispersion can be compensated under the flat gain characteristics to a wavelength.

While the invention has been described with reference to the specific embodiment, it will be apparent to those skilled in the art that various changes and modifications can be made to the specific embodiment without departing from the spirit and scope of the invention as defined in the claims.

What is claimed is:

1. A dispersion compensator comprising:
    a first optical path pair having first and second optical paths;
    a second optical path pair having third and fourth optical paths;
    an optical coupler, comprising a beam splitter, connected to one end of the first, second, third, and fourth optical paths to split light from the first optical path pair into the third and fourth optical paths and light from the second optical path pair into the first and second optical paths;
    an optical signal input/output device to input an optical signal into the first optical path through the other end of the first optical path and output light output from the other end of the first optical path; and
    three mirrors disposed respectively on the other end of the second, third, and fourth optical paths,
    wherein at least two of the three mirrors are slidable in its respective optical axis direction, and wherein the first, second, third, and fourth optical paths comprise an open optical system.

2. The dispersion compensator of claim 1, wherein an optical branching ratio of the optical coupler is a function of wavelength.

3. A dispersion compensator comprising:
    a first optical path pair having first and second optical paths;
    a second optical path pair having third and fourth optical paths;
    a directional optical coupler connected to one end of the first, second, third, and fourth optical paths to split light from the first optical path pair into the third and fourth optical paths and light from the second optical path pair into the first and second optical paths;

an optical signal input/output device to input an optical signal into the first optical path through the other end of the first optical path and output light output from the other end of the first optical path; and three mirrors disposed respectively on the other end of the second, third, and fourth optical paths; and means to control the optical lengths of at least two of the first, second, third, and fourth optical paths.

4. The dispersion compensator of claim 3, wherein the first, second, third, and fourth optical paths comprise an optical waveguide.

5. The dispersion compensator of claim 3 wherein an optical branching ratio of the optical coupler is a function of wavelength.

* * * * *